(12) United States Patent
Wang et al.

(10) Patent No.: US 11,061,277 B2
(45) Date of Patent: Jul. 13, 2021

(54) DIFFUSION SHEET, BACKLIGHT MODULE, LIQUID CRYSTAL DISPLAY PANEL, AND DISPLAY DEVICE

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Kaiwen Wang, Beijing (CN); Mookeun Shin, Beijing (CN); Hui Dong, Beijing (CN); Aixia Sang, Beijing (CN); Haifeng Xu, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/642,776

(22) PCT Filed: May 8, 2019

(86) PCT No.: PCT/CN2019/085929
§ 371 (c)(1),
(2) Date: Feb. 27, 2020

(87) PCT Pub. No.: WO2019/214633
PCT Pub. Date: Nov. 14, 2019

(65) Prior Publication Data
US 2021/0080787 A1    Mar. 18, 2021

(30) Foreign Application Priority Data
May 10, 2018  (CN) .......................... 201820698369.8

(51) Int. Cl.
*G02B 5/02*  (2006.01)
*F21V 5/08*  (2006.01)
(Continued)

(52) U.S. Cl.
CPC .. *G02F 1/133606* (2013.01); *G02F 1/133607* (2021.01)

(58) Field of Classification Search
CPC ... G02F 1/133606; G02F 2001/133607; G02B 5/02; F21V 5/08
See application file for complete search history.

(56) References Cited

U.S. PATENT DOCUMENTS

| 6,053,619 A | 4/2000 | Nakamura et al. |
| 7,342,618 B2 | 3/2008 | Kim |

(Continued)

FOREIGN PATENT DOCUMENTS

| CN | 101975371 A | 2/2011 |
| CN | 102597603 A | 7/2012 |

(Continued)

OTHER PUBLICATIONS

International Search Report received for PCT Patent Application No. PCT/CN2019/085929, dated Aug. 7, 2019, 8 pages (3 pages of English Translation and 5 pages of Original Document).

*Primary Examiner* — Karabi Guharay
(74) *Attorney, Agent, or Firm* — Womble Bond Dickinson (US) LLP (57) ABSTRACT

A diffusion sheet, a backlight module, a liquid crystal display panel and a display device are disclosed. The diffusion sheet comprises a base layer, a white printed layer and a black printed layer. The base layer comprises a peripheral region and a light transmitting region. The white printed layer and the black printed layer are arranged in the peripheral region. In a direction from a light incident surface to a (Continued)

light exit surface of the base layer, the black printed layer and the white printed layer are arranged in this order. An orthographic projection of the black printed layer on the base layer falls within an orthographic projection of the white printed layer on the base layer. In this way, the white printed layer can block a shadow which is formed by reflection of the black printed layer from the prismatic sheet, and thus improve the display quality.

10 Claims, 5 Drawing Sheets

(51) Int. Cl.
    *G02F 1/13357*     (2006.01)
    *G02F 1/1335*     (2006.01)

(56) References Cited

U.S. PATENT DOCUMENTS

2009/0316083 A1* 12/2009 Kishioka ........... G02F 1/133526
                                                                    349/95
2011/0141397 A1     6/2011 Lee
2012/0230008 A1     9/2012 Ajichi et al.

FOREIGN PATENT DOCUMENTS

| | | |
|---|---|---|
| CN | 205191366 U | 4/2016 |
| CN | 205844693 U | 12/2016 |
| CN | 208060755 U | 11/2018 |
| TW | I437279 B | 5/2014 |

* cited by examiner

DIFFUSION SHEET, BACKLIGHT MODULE, LIQUID CRYSTAL DISPLAY PANEL, AND DISPLAY DEVICE

RELATED APPLICATIONS

The present application is a 35 U.S.C. 371 national stage application of PCT International Application No. PCT/CN2019/085929, filed on May 8, 2019, which claims the benefit of Chinese Patent Application No. 201820698369.8, filed on May 10, 2018, the entire disclosures of which are incorporated herein by reference.

TECHNICAL FIELD

The present disclosure relates to the field of display technologies, and particularly to a diffusion sheet, a backlight module, a liquid crystal display panel, and a display device.

BACKGROUND

A liquid crystal display (LCD) comprises a backlight module and a liquid crystal panel. The liquid crystal panel does not emit light by itself. The backlight module is an optical device, and has the function of providing a planar light source with enough brightness and uniform distribution to the liquid crystal panel. The backlight module currently comprises a direct type and a side entry type. Since a light-emitting diode (LED) in itself is a point light source, in the direct type backlight module, bright spots, colored spots, and Mura are prone to appear in the display image, and the total thickness of the module increases. Thus, in order to solve this problem, the side entry type backlight module is popular currently. In the side entry type backlight module, the back light source inputs light at a side edge of the panel, and LEDs are arranged a side edge of the panel opposite to the display region. The side entry type backlight module mainly comprises a light source, a light guide plate, a reflection sheet, a diffusion sheet and a prismatic sheet. A micro-structure at a side edge of the light guide plate is used to convert the point light source from LED into a linear light source, which is delivered into the light guide plate. By means of a reflection sheet at a bottom of the light guide plate, the linear light source delivered inside the light guide plate is converted from a linear light source in the horizontal direction into a planar light source in the vertical direction. The planar light source is output through an upper surface of the light guide plate. The planar light source is then subject to diffusion, frosting and defect-removing process by a diffusion sheet, so as to provide a stable light source.

In a borderless liquid crystal display, a black printed layer at a side where the back light source is located will generate a film shadow, which affects the display quality. Thus, there is a room for improvement.

SUMMARY

Thus, embodiments of the present disclosure provide a diffusion sheet, comprising a base layer, a white printed layer, and a black printed layer; wherein the base layer comprises a peripheral region and a light transmitting region; wherein the white printed layer and the black printed layer are arranged in the peripheral region, and in a direction from a light incident surface to a light exit surface of the base layer, the black printed layer and the white printed layer are arranged in this order; and wherein an orthographic projection of the black printed layer on the base layer falls within an orthographic projection of the white printed layer on the base layer.

In one or more embodiments, in the diffusion sheet as described above according to embodiments of the present disclosure, the black printed layer is arranged on a side of the base layer where the light incident surface is located, and the white printed layer is arranged between the black printed layer and the light incident surface of the base layer. Optionally, the white printed layer is arranged on a side of the base layer where the light exit surface is located, and the black printed layer is arranged between the white printed layer and the light exit surface of the base layer. Optionally, the white printed layer is arranged on a side of the base layer where the light exit surface is located, and the black printed layer is arranged on a side of the base layer where the light incident surface is located.

In one or more embodiments, in the diffusion sheet as described above according to embodiments of the present disclosure, in a direction from the peripheral region to the light transmitting region, a width of the orthographic projection of the white printed layer on the base layer is larger than a width of the orthographic projection of the black printed layer on the base layer, and a side face of the white printed layer away from the light transmitting region and a side face of the black printed layer away from the light transmitting region are flush with a side face of the base layer.

In one or more embodiments, in the diffusion sheet as described above according to embodiments of the present disclosure, a width of the orthographic projection of the black printed layer on the base layer is larger than or equal to 1.6 mm and is smaller than or equal to 2 mm, and a width of the orthographic projection of the white printed layer on the base layer is larger than or equal to 1.8 mm and is smaller than or equal to 2.2 mm.

In one or more embodiments, in the diffusion sheet as described above according to embodiments of the present disclosure, both the black printed layer and the white printed layer are made from trimethyl cyclohexenone.

Accordingly, embodiments of the present disclosure further provide a backlight module, comprising a back light source and a light guide plate, wherein the back light source is arranged on a side face of the light guide plate, wherein the backlight module further comprises the diffusion sheet as described above, the diffusion sheet is arranged on a side of a side of the light guide plate where a light exit surface is located, and the peripheral region of the base layer is arranged close to the back light source In one or more embodiments, in the backlight module as described above according to embodiments of the present disclosure, the backlight module further comprises a prismatic sheet which is arranged on a side of the diffusion sheet away from the light exit surface of the light guide plate, wherein the prismatic sheet comprises a first surface and a second surface which are parallel with the light exit surface of the light guide plate, and side face connecting the first surface and the second surface, the first surface and the second surface are planar surfaces, the side face is an inclined surface, and an intersection angle between the inclined surface and a horizontal plane which points from the peripheral region to the back light source direction is an acute angle; and wherein an orthographic projection of a side edge of the white printed layer close to the light transmitting region on the base layer falls within an orthographic projection of the inclined surface on the base layer.

In one or more embodiments, in the backlight module as described above according to embodiments of the present disclosure, the acute angle is larger than or equal to 75°.

Accordingly, embodiments of the present disclosure further provide a liquid crystal display panel, comprising the backlight module as described above.

Accordingly, embodiments of the present disclosure further provide a display device, comprising the liquid crystal display panel in embodiments of the present disclosure provide as described above.

DETAILED DESCRIPTION OF EMBODIMENTS

A diffusion sheet, a backlight module, a liquid crystal display panel, and a display device in embodiments of the present disclosure will be described in more detail hereinafter with reference to the accompanying drawings.

The size and shape of a structure in the drawings do not reflect the true scale of the diffusion sheet and the backlight module as described above, and only serves for the purpose of illustrating the technical solutions of the present disclosure.

For the sake of the appearance and a maximized display image, a liquid crystal display has developed from a three-side borderless liquid crystal display to a four-side borderless liquid crystal display. The four-side borderless liquid crystal display has a narrow bezel. In order to prevent exposure of the light source and leakage of light, the diffusion sheet at the side where the back light source is located is always provided with a black printed layer. As compared with the three-side borderless liquid crystal display, the four-side borderless liquid crystal display has a narrower bezel at the side where the back light source is located, and the bezel usually is wider than the black printed layer only by 0.5 mm-2 mm. In one aspect, the black printed layer at the side where the back light source is located is reflected by the prismatic sheet and a film shadow occurs. The present of this shadow causes the width of the black printed layer to increase. This kind of shadow is clearly visible at a wide range of viewing angle, so that the display quality at the light input side is seriously affected. In another aspect, the black printed layer absorbs light output from the underlying light guide plate. Due to absorption of light by the black printed layer, the intensity of light around the black printed layer is relatively low, and appears to be darker than the light transmitting region. This is perceived by human eyes as a dark belt. The dark belt further increases the width of the black printed layer, so that the display quality is affected.

In view of this, embodiments of the present disclosure provide a diffusion sheet, a backlight module, a liquid crystal display panel, and a display device, to solve the problem in the known technique in which a shadow appears in the display image due to the arrangement of a black edge printed layer.

Figure 1:
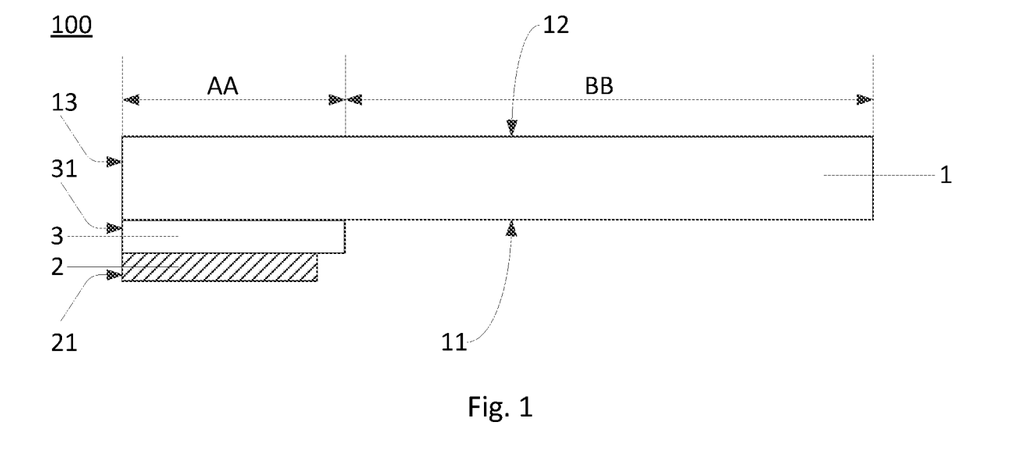
FIG. 1 is a structural view for illustrating a diffusion sheet in embodiments of the present disclosure.
Figure 2:
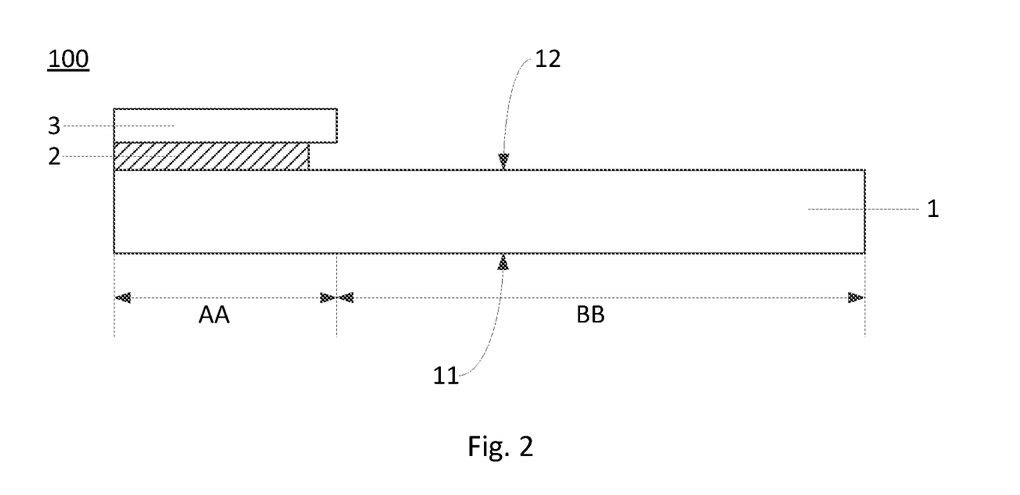
FIG. 2 is a structural view for illustrating a diffusion sheet in embodiments of the present disclosure.
Figure 3:
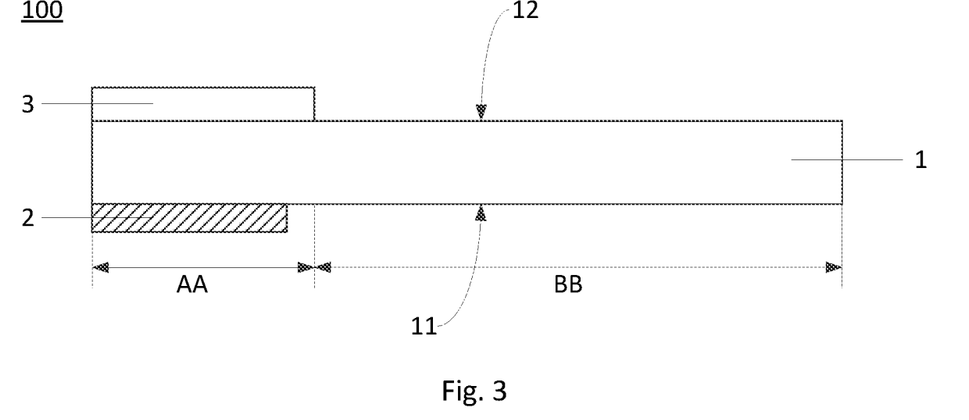
FIG. 3 is a structural view for illustrating a diffusion sheet in embodiments of the present disclosure.

In embodiments of the present disclosure, as shown in FIGS. 1-3, a diffusion sheet 100 comprises a base layer 1, a black printed layer 2 and a white printed layer 3. The base layer 1 comprises a peripheral region AA and a light transmitting region BB. The black printed layer 2 and the white printed layer 3 are arranged in the peripheral region AA. In a direction from a light incident surface 11 to a light exit surface 12 of the base layer 1, the black printed layer 2 and the white printed layer 3 are arranged in this order.

An orthographic projection of the black printed layer 2 on the base layer 1 falls within an orthographic projection of the white printed layer 3 on the base layer 1.

In the diffusion sheet according to embodiments of the present disclosure, a black printed layer is arranged in a peripheral region of the diffusion sheet to prevent the high intensity light from the light input side from entering a viewing area of the display panel, thus effectively preventing light leakage. The backlight module further comprises a prismatic sheet. In order to prevent a shadow from being formed by reflection of the black printed layer from the prismatic sheet, which would increase the width of the black printed layer and affect the display quality, in the present disclosure, a white printed layer is further arranged at periphery of the diffusion sheet, and the orthographic projection of the black printed layer on the base layer falls within the orthographic projection of the white printed layer on the base layer. As a result, the white printed layer can block reflection of the black printed layer from the prismatic sheet, and thus can prevent the shadow which would otherwise be formed by the reflection. In this way, the display quality is increased.

During implementations, in embodiments of the present disclosure, the base layer is a transparent base layer.

In an exemplary embodiment, as shown in FIG. 1, the black printed layer 2 is arranged on a side of the base layer 1 where the light incident surface 11 is located, and the white printed layer 3 is arranged between the black printed layer 2 and the light incident surface 11 of the base layer 1.

In an exemplary embodiment, as shown in FIG. 2, the white printed layer 3 is arranged on a side of the base layer 1 where the light exit surface 12 is located, and the black printed layer 2 is arranged between the white printed layer 3 and the light exit surface 12 of the base layer 1.

In an exemplary embodiment, as shown in FIG. 3, the white printed layer 3 is arranged on the side of the base layer 1 where the light exit surface 12 is located, and the black printed layer 2 is arranged on the side of the base layer 1 where the light incident surface 11 is located.

The black printed layer 2 is used to absorb light which is emitted by the back light source of the backlight module and which directly enters the diffusion sheet without passing through the light guide plate, thus effectively preventing light leakage. The orthographic projection of the black printed layer 2 on the base layer 1 falls within the orthographic projection of the white printed layer 3 on the base layer 1. In this way, the white printed layer 3 can block the shadow which is formed by reflection of the black printed layer 2 from the prismatic sheet of the backlight module, thus improving the display quality.

Furthermore, during implementations, in order to effectively prevent the light emitted by the back light source from directly entering the diffusion sheet without entering the light guide plate and from emitting from the periphery close to the back light source, and to effectively block the shadow which is formed by reflection of the black printed layer 2 from the prismatic sheet, in the diffusion sheet according to embodiments of the present disclosure, as shown in FIGS. 1-3, in the direction from the peripheral region AA to the light transmitting region BB, the orthographic projection of the white printed layer 3 on the base layer 1 has a width larger than a width of the orthographic projection of the black printed layer 2 on the base layer 1. In addition, a side face 31 of the white printed layer 3 away from the light transmitting region BB and a side face 21 of the black printed layer 2 away from the light transmitting region BB are arranged flush with a side face 13 of the base layer 1.

Furthermore, during implementations, in the diffusion sheet according to embodiments of the present disclosure, in case the width of the orthographic projection of the black printed layer on the base layer is larger than or equal to 1.6 mm and is smaller than or equal to 2 mm, light leakage can be effectively prevented. In case the width of the white printed layer is larger than the width of the black printed layer by about 0.2 mm, the shadow can be effectively blocked. Thus, the width of the orthographic projection of the white printed layer on the base layer is larger than or equal to 1.8 mm and is smaller than or equal to 2.2 mm.

Furthermore, during implementations, in the diffusion sheet according to embodiments of the present disclosure, both the black printed layer and the white printed layer are made from trimethyl cyclohexenone. In order to provide an enhanced effect of blocking shadow, ink particles for the white printed layer are required to have a small and uniform size and a color of pure white. The black printed layer is same as a common ink, and is only required to provide the effect of blocking light leakage.

Figure 4:
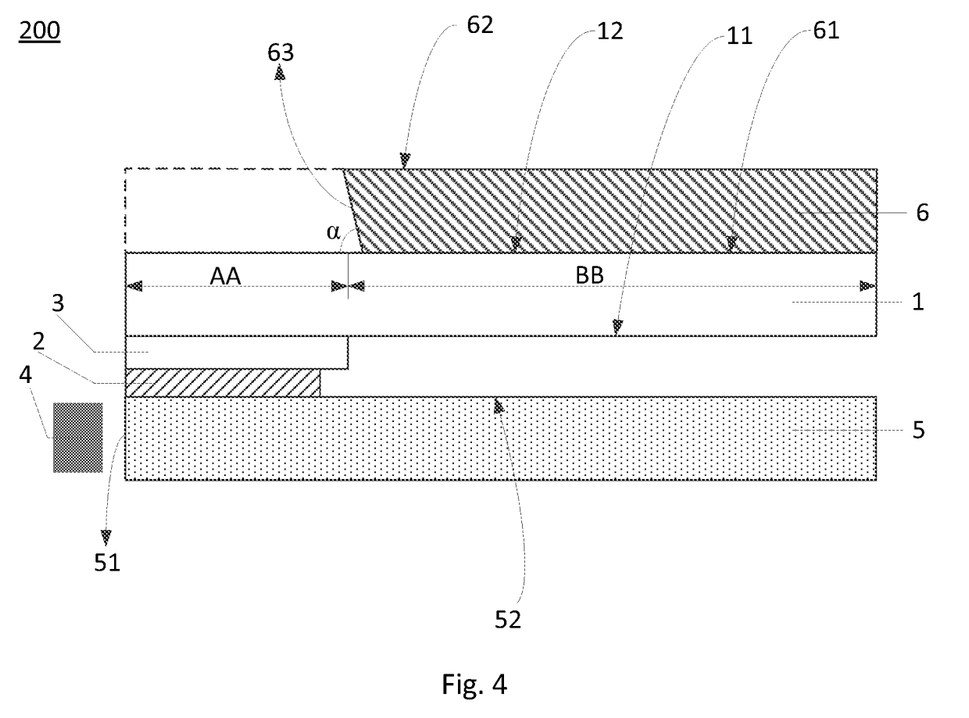
FIG. 4 is a structural view for illustrating a backlight module in embodiments of the present disclosure.
Figure 5:
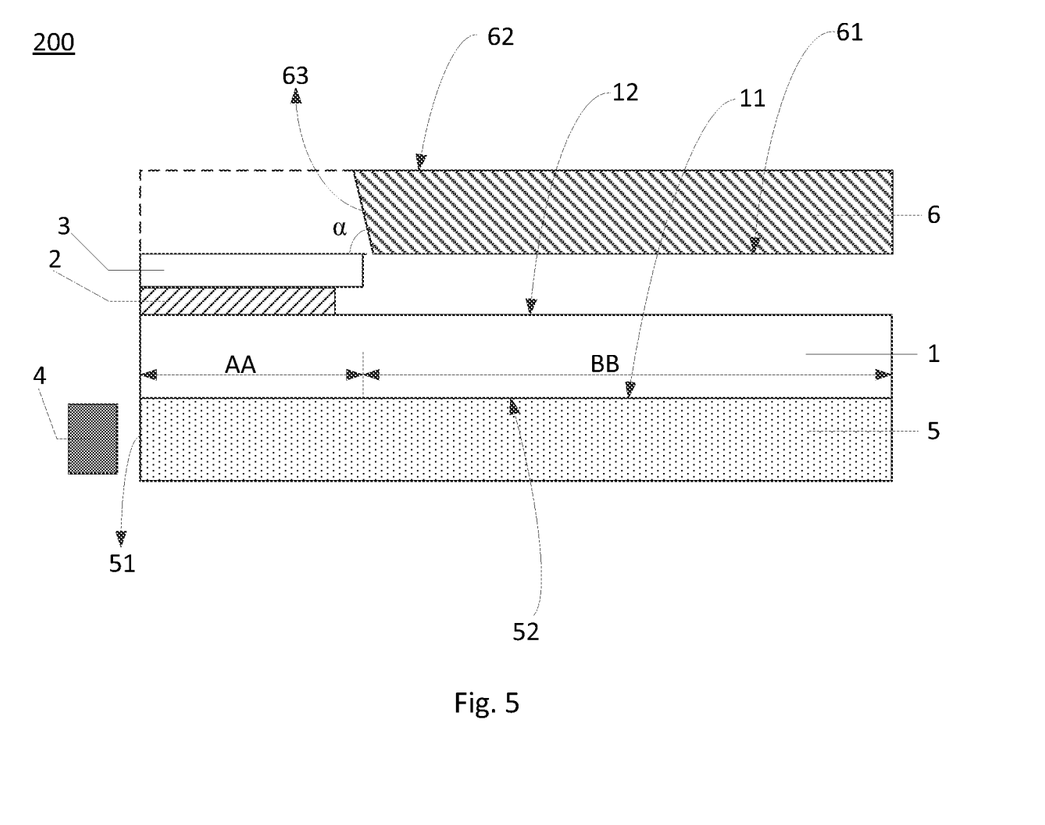
FIG. 5 is a structural view for illustrating a backlight module in embodiments of the present disclosure.
Figure 6:
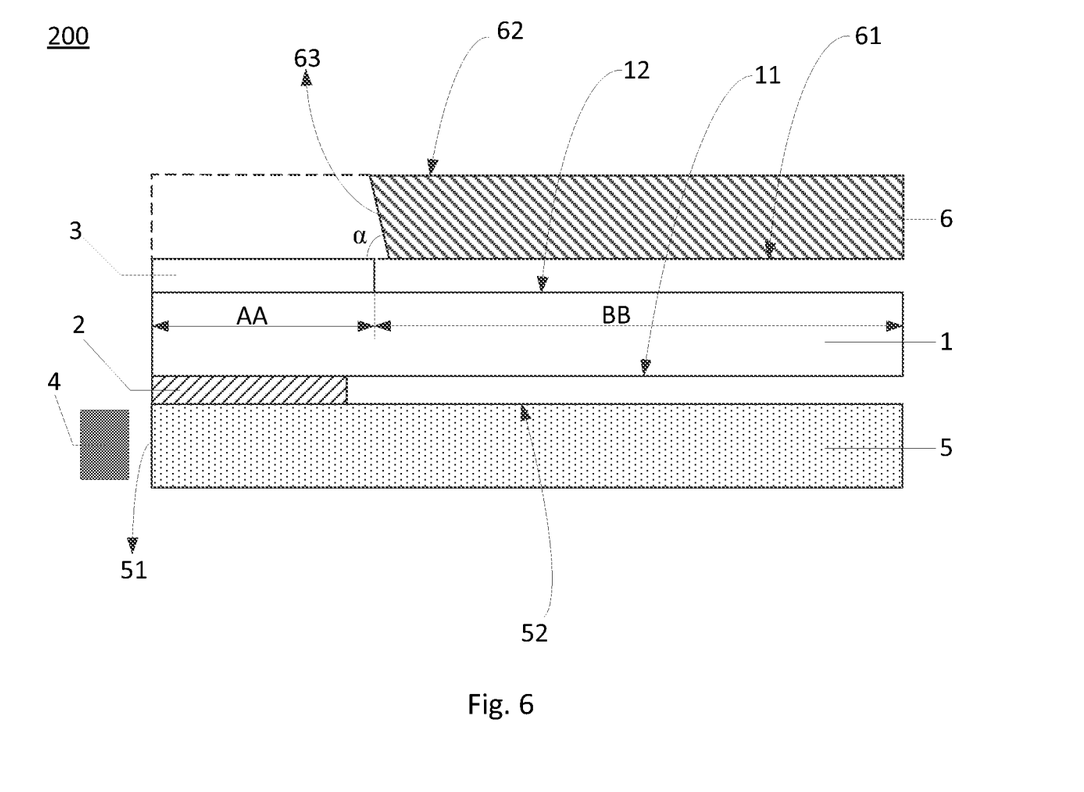
FIG. 6 is a structural view for illustrating a backlight module in embodiments of the present disclosure.

Based on a same inventive concept, embodiments of the present disclosure further provide a backlight module 200. As shown in FIGS. 4-6, the backlight module 200 comprises a back light source 4 and a light guide plate 5. The back light source 4 is arranged on a side face 51 of the light guide plate 5. The backlight module 200 further comprises the diffusion sheet in the above embodiments which is arranged on a side of the light guide plate 5 where a light exit surface 52 is located. The peripheral region of the base layer 1 is arranged close to the back light source 4.

Furthermore, during implementations, the backlight module according to embodiments of the present disclosure, as shown in FIGS. 4-6, further comprises a prismatic sheet 6. The prismatic sheet 6 is arranged on a side of the diffusion sheet away from the light exit surface 52 of the light guide plate 5. The prismatic sheet 6 comprises a first surface 61 and a second surface 62 which are parallel with the light exit surface 52 of the light guide plate 5, and a side face 63 connecting the first surface 61 and the second surface 62. The first surface 61 and the second surface 62 are planar surfaces, and the side face 63 is an inclined surface (with respect to the first surface or the second surface). An intersection angle between the side face 63 and a horizontal plane in a direction from the peripheral region AA to the back light source 4 is acute angle α. As a result, the light emitted by the light guide plate 5 enters the prismatic sheet at an angle larger than or equal to 90° through a side edge of the white printed layer 3 close to light transmitting region BB.

Figure 7:
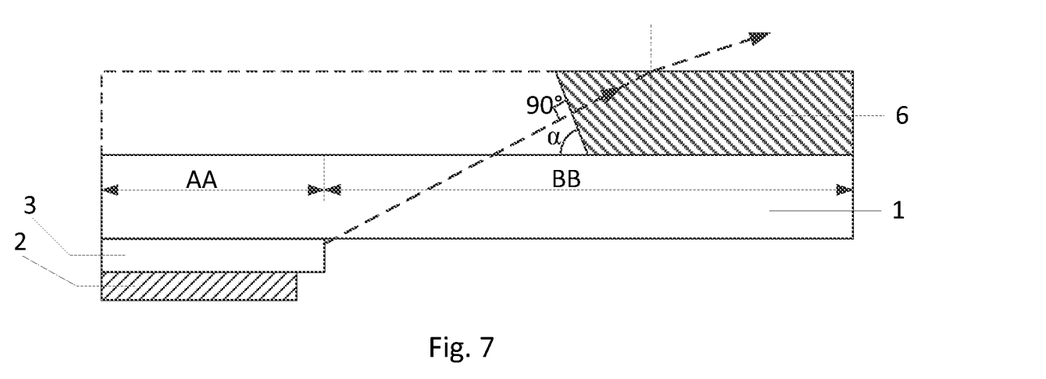
FIG. 7 is a partial structural view for illustrating a backlight module in embodiments of the present disclosure.

As shown in FIG. 7, the light emitted by the light guide plate 5 at an angle of 90° through the side edge of the white printed layer 3 close to light transmitting region BB. In this way, the light which enters the prismatic sheet through the side edge of the white printed layer 3 close to light transmitting region BB produces no reflection, and directly enters the prismatic sheet 6 (as shown by a dashed arrow in FIG. 7). The light which enters the prismatic sheet through the side edge of the white printed layer 3 close to light transmitting region BB does not form shadow due to reflection on the prismatic sheet, thus improving the display quality.

Figure 8:
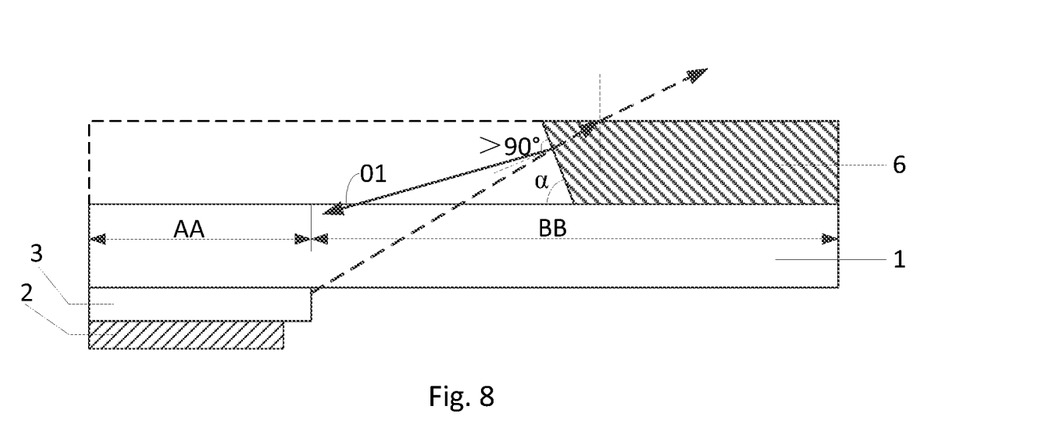
FIG. 8 is a partial structural view for illustrating a backlight module in embodiments of the present disclosure.

As shown in FIG. 8, the light emitted by the light guide plate 5 enter the prismatic sheet 6 at an angle larger than 90° (e.g., an obtuse angle) through the side edge of the white printed layer 3 close to light transmitting region BB (as shown by dashed arrows in FIG. 8). In this case, light is reflected towards the peripheral region AA (as shown by the arrow 01), shadow is formed in the peripheral region AA, and no shadow is formed in the light transmitting region BB. Thus, the problem of shadow is completely solved.

The white printed layer 3 is used for blocking shadow. The orthographic projection of the side edge of the white printed layer 3 close to the light transmitting region BB on the base layer 1 falls within the orthographic projection of the side face 63 on the base layer 1. This can better solve the shadow problem.

It is noted that only a portion of the backlight module is schematically shown in FIGS. 7-8, and the structure of other films and layers is shown in FIGS. 4-6.

Furthermore, during implementations, for the purpose that the light emitted by the light guide plate 5 enters the prismatic sheet at an angle larger than or equal to 90° through the side edge of the white printed layer 3 close to light transmitting region BB, in the backlight module according to embodiments of the present disclosure, as shown in FIGS. 4-6, the acute angle α is larger than or equal to 75°. In this way, the light which enters the prismatic sheet through the side edge of the white printed layer 3 close to light transmitting region BB will not form reflection shadow on a portion of the black printed layer 2 close to the light transmitting region BB. Thus, the problem of shadow is completely solved.

It is noted that FIGS. 4-6 only show structural views for clearly showing the structure of respective component and these drawings are not drawn to a true scale. In FIGS. 4-6, on the light incident surface 11 and/or the light exit surface 12 of the base layer 1, the black printed layer 2 and/or the white printed layer 3 are formed by silk-screen printing. As shown in FIG. 4, the light incident surface 11 of the base layer 1 is provided with the black printed layer 2 and the white printed layer 3 by silk-screen printing, and the light exit surface 52 of the light guide plate 5 and the light incident surface 11 of the base layer 1 are closely arranged without spacing. As shown in FIG. 5, the light exit surface 12 of the base layer 1 is provided with the black printed layer 2 and the white printed layer 3 by silk-screen printing, and the first surface 61 of the prismatic sheet 6 and the light exit surface 12 of the base layer 1 are closely arranged without spacing. As shown in FIG. 6, the light incident surface 11 of the base layer 1 is provided with the black printed layer 2 by silk-screen printing, the light exit surface 12 of the base layer 1 is provided with the white printed layer 3 by silk-screen printing, the light exit surface 52 of the light guide plate 5 and the light incident surface 11 of the base layer 1 are closely arranged without spacing, and the first surface 61 of the prismatic sheet 6 and the light exit surface 12 of the base layer 1 are closely arranged without spacing. Thicknesses of the black printed layer 2 and the white printed layer 3 can be ignored. A gap between the light guide plate 5 or the prismatic sheet 6 and the base layer 1 is formed due to the silk-screen printed black printed layer 2 and white printed layer 3, but is not so wide shown in FIGS. 4-6.

Based on a same inventive concept, embodiments of the present disclosure further provide a liquid crystal display panel, comprising the backlight module as described above according to embodiments of the present disclosure.

During implementations, the backlight module further comprises components like a reflection sheet, a front frame, and a back plate on a side of the light guide plate opposite to the light exit surface. The arrangement and function of these components is same with the known technique, and is not repeated herein for simplicity.

Based on a same inventive concept, embodiments of the present disclosure further provide a display device, comprising the liquid crystal display panel as described above according to embodiments of the present disclosure. The display device can be any product or component with a display function like a mobile phone, tablet computer, TV, monitor, notebook computer, digital photo frame, and navigator. As for embodiments of the display device, reference can be made to the above embodiments for the diffusion sheet and the backlight module.

In the diffusion sheet according to embodiments of the present disclosure, a black printed layer is arranged in a peripheral region of the diffusion sheet to prevent the high intensity light from the light input side from entering a viewing area of the display panel, thus effectively preventing light leakage. The backlight module further comprises a prismatic sheet. In order to prevent a shadow from being formed by reflection of the black printed layer from the prismatic sheet, which would increase the width of the black printed layer and affect the display quality, in the present disclosure, a white printed layer is further arranged at periphery of the diffusion sheet, and the orthographic projection of the black printed layer on the base layer falls within the orthographic projection of the white printed layer on the base layer. As a result, the white printed layer can block reflection of the black printed layer from the prismatic sheet, and thus can prevent the shadow which would otherwise be formed by the reflection. In this way, the display quality is increased.

It will be appreciated that the present invention is not limited to the exact construction that has been described above and illustrated in the accompanying drawings, and that various modifications and changes can be made without departing from the scope thereof. It is intended that the scope of the present invention only be limited by the appended claims.

What is claimed is:

1. A diffusion sheet, comprising a base layer, a white printed layer, and a black printed layer;
   wherein the base layer comprises a peripheral region and a light transmitting region;
   wherein the white printed layer and the black printed layer are arranged in the peripheral region, and in a direction from a light incident surface to a light exit surface of the base layer, the black printed layer and the white printed layer are arranged in this order; and
   wherein an orthographic projection of the black printed layer on the base layer falls within an orthographic projection of the white printed layer on the base layer,
   wherein in a direction from the peripheral region to the light transmitting region, a width of the orthographic projection of the white printed layer on the base layer is larger than a width of the orthographic projection of the black printed layer on the base layer, and a side face of the white printed layer away from the light transmitting region and a side face of the black printed layer away from the light transmitting region are flush with a side face of the base layer.

2. The diffusion sheet of claim 1, wherein the black printed layer is arranged on a side of the base layer where the light incident surface is located, and the white printed layer is arranged between the black printed layer and the light incident surface of the base layer.

3. The diffusion sheet of claim 1, wherein the white printed layer is arranged on a side of the base layer where the light exit surface is located, and the black printed layer is arranged between the white printed layer and the light exit surface of the base layer.

4. The diffusion sheet of claim 1, wherein the white printed layer is arranged on a side of the base layer where the light exit surface is located, and the black printed layer is arranged on a side of the base layer where the light incident surface is located.

5. The diffusion sheet of claim 1, wherein a width of the orthographic projection of the black printed layer on the base layer is larger than or equal to 1.6 mm and is smaller than or equal to 2 mm, and a width of the orthographic projection of the white printed layer on the base layer is larger than or equal to 1.8 mm and is smaller than or equal to 2.2 mm.

6. The diffusion sheet of claim 1, wherein both the black printed layer and the white printed layer are made from trimethyl cyclohexenone.

7. A backlight module, comprising a back light source and a light guide plate, wherein the back light source is arranged on a side face of the light guide plate,
   wherein the backlight module further comprises the diffusion sheet of claim 1, the diffusion sheet is arranged on a side of a side of the light guide plate where a light exit surface is located, and the peripheral region of the base layer is arranged close to the back light source,
   the backlight module further comprising a prismatic sheet which is arranged on a side of the diffusion sheet away from the light exit surface of the light guide plate,
   wherein the prismatic sheet comprises a first surface and a second surface which are parallel with the light exit surface of the light guide plate, and side face connecting the first surface and the second surface, the first surface and the second surface are planar surfaces, the side face is an inclined surface and an intersection angle between the inclined surface and a horizontal plane which points from the peripheral region to the back light source direction is an acute angle; and
   wherein an orthographic projection of a side edge of the white printed layer close to the light transmitting region on the base layer falls within an orthographic projection of the inclined surface on the base layer.

8. The backlight module of claim 7, wherein the acute angle is larger than or equal to 75°.

9. A liquid crystal display panel, comprising the backlight module of claim 7.

10. A display device, comprising the liquid crystal display panel of claim 9.

* * * * *